United States Patent
Banga et al.

(10) Patent No.: US 9,106,690 B1
(45) Date of Patent: Aug. 11, 2015

(54) SECURING AN ENDPOINT BY PROXYING DOCUMENT OBJECT MODELS AND WINDOWS

(75) Inventors: Gaurav Banga, Cupertino, CA (US); Kiran Bondalapati, Los Altos, CA (US); Vikram Kapoor, Cupertino, CA (US)

(73) Assignee: Bromium, Inc., Cupertino, CA (US)

( * ) Notice: Subject to any disclaimer, the term of this patent is extended or adjusted under 35 U.S.C. 154(b) by 323 days.

(21) Appl. No.: 13/523,859

(22) Filed: Jun. 14, 2012

(51) Int. Cl.
*H04L 29/06* (2006.01)
*G06F 17/21* (2006.01)

(52) U.S. Cl.
CPC ............ *H04L 63/1433* (2013.01); *G06F 17/21* (2013.01)

(58) Field of Classification Search
CPC ............................ H04L 63/1433; G06F 17/21
USPC ................................................ 726/1; 715/239
See application file for complete search history.

(56) References Cited

U.S. PATENT DOCUMENTS

| | | | | |
|---|---|---|---|---|
| 6,009,442 A * | 12/1999 | Chen et al. | ...................... | 715/205 |
| 6,088,032 A * | 7/2000 | Mackinlay | ...................... | 715/848 |
| 6,725,424 B1 * | 4/2004 | Schwerdtfeger et al. | ...... | 715/239 |
| 6,766,333 B1 * | 7/2004 | Wu et al. | ................................ | 1/1 |
| 6,829,746 B1 * | 12/2004 | Schwerdtfeger et al. | ...... | 715/239 |
| 7,376,698 B2 * | 5/2008 | Pik et al. | ........................ | 709/203 |
| 7,523,158 B1 * | 4/2009 | Nickerson et al. | ............ | 709/203 |
| 7,574,486 B1 * | 8/2009 | Cheng et al. | ................... | 709/219 |
| 7,797,630 B2 * | 9/2010 | Kashi | ............................. | 715/268 |
| 7,865,953 B1 * | 1/2011 | Hsieh et al. | ....................... | 726/22 |
| 8,095,770 B2 * | 1/2012 | Cameron et al. | ................ | 711/202 |
| 8,601,364 B2 * | 12/2013 | Jaquish et al. | .................. | 715/234 |
| 2002/0033838 A1 * | 3/2002 | Krueger et al. | ................ | 345/700 |
| 2003/0014442 A1 * | 1/2003 | Shiigi et al. | .................... | 707/513 |
| 2004/0230906 A1 * | 11/2004 | Pik et al. | ......................... | 715/522 |
| 2006/0005119 A1 * | 1/2006 | Karun et al. | .................... | 715/513 |
| 2008/0127055 A1 * | 5/2008 | Davis et al. | .................... | 717/106 |
| 2008/0215997 A1 * | 9/2008 | Wu et al. | ......................... | 715/760 |
| 2009/0070663 A1 * | 3/2009 | Fan et al. | ........................ | 715/234 |
| 2009/0070869 A1 * | 3/2009 | Fan et al. | .......................... | 726/22 |
| 2009/0293102 A1 * | 11/2009 | Klein et al. | ....................... | 726/2 |
| 2009/0328063 A1 * | 12/2009 | Corvera et al. | ............... | 719/315 |
| 2010/0287347 A1 * | 11/2010 | Cameron et al. | ............... | 711/162 |
| 2010/0332722 A1 * | 12/2010 | Oiwa et al. | ......................... | 711/6 |
| 2011/0016449 A1 * | 1/2011 | Yao et al. | ........................ | 717/106 |
| 2011/0055685 A1 * | 3/2011 | Jaquish et al. | ................. | 715/234 |
| 2012/0101907 A1 * | 4/2012 | Dodda | ......................... | 705/14.73 |
| 2012/0204250 A1 * | 8/2012 | Anderson et al. | .................. | 726/9 |
| 2012/0227081 A1 * | 9/2012 | Huitsing et al. | ................... | 726/1 |
| 2012/0331374 A1 * | 12/2012 | Fanning et al. | ............... | 715/234 |
| 2012/0331375 A1 * | 12/2012 | Fanning et al. | ............... | 715/234 |
| 2013/0031462 A1 * | 1/2013 | Calvo et al. | .................... | 715/234 |

(Continued)

*Primary Examiner* — David Garcia Cervetti
(74) *Attorney, Agent, or Firm* — Brokaw Patent Law PC; Christopher J. Brokaw

(57) ABSTRACT

Approaches for ensuring a document does not inadvertently link or contain to any malicious content. A request from a document embedded within a parent web page itself, or comprised within a window launched by the parent web page, is received. The request is executed in a memory address space separate from a memory address space in which the parent web page resides. The execution of the request is performed using a parent proxy that represents the parent web page. Any malicious actions resulting from the performance of the request affect the parent proxy rather than the parent web page. The parent proxy provides at least a portion of the results of executing the request to a child proxy, which in turn determines what, if any, content within the results should be sent to the web browser rendering the parent web page.

26 Claims, 4 Drawing Sheets

(56) References Cited

U.S. PATENT DOCUMENTS

| | | | |
|---|---|---|---|
| 2013/0117530 A1* | 5/2013 | Kim et al. | 711/206 |
| 2013/0191880 A1* | 7/2013 | Conlan et al. | 726/1 |
| 2013/0198607 A1* | 8/2013 | Mischook et al. | 715/234 |
| 2013/0227248 A1* | 8/2013 | Mehta et al. | 711/207 |
| 2013/0227397 A1* | 8/2013 | Tvorun et al. | 715/235 |
| 2014/0068197 A1* | 3/2014 | Joshi et al. | 711/135 |
| 2014/0089788 A1* | 3/2014 | Jaquish et al. | 715/240 |

* cited by examiner

SECURING AN ENDPOINT BY PROXYING DOCUMENT OBJECT MODELS AND WINDOWS

FIELD OF THE INVENTION

Embodiments of the invention relate to securing a document against any undesirable actions or consequences requested by or resulting from associated content.

BACKGROUND

Web pages have, over the years, grown more complex. Currently, it is not uncommon for a web page to embed content from a variety of different sources, such as one or more advertisements served from an ad server, portions of content served from other sources, and/or links to social media services.

A common way in which such content is embedded into a web page is through the use of an iFrame. An iFrame is an HTML element that defines an inline frame in a document that may be used to embed another document, such as a web page, image, advertisement, and the like, into that document. To illustrate how an iFrame may be used, consider FIG. 1, which is a block diagram of a web page according to the prior art. Web page 10 includes three separate embedded documents. These three embedded documents reside within the bounded areas defined by iFrames 20, 22, and 24.

As an iFrame may be used to embed content from any source into a web page, iFrames 20, 22, and 24 may be used to display content from different sources. For example, iFrame 20 may be used to display an advertisement served from an ad server, iFrame 22 may embed a web page served from the same domain as web page 10, and iFrame 24 may embed a web page served from a different domain than which served web page 10.

Any data, such as content embedded into a web page, that originates from an untrusted source has the potential to carry malicious code. Thus, any content embedded within web page 10 that originates from outside the trusted domain that hosts web page 10 may contain code that can be used to hijack or otherwise alter the parent web page in an unauthorized manner. Because of this concern, an administrator of a web site may not allow web site 10 to embed any content from an external source. While this may be a good rule of thumb, it is naïve to think all web sites would adhere to this practice. Additionally, there may be instances when the administrator of a web site wishes a web site to link to or embed content originating from an untrusted source, as the perceived benefits of doing so might outweigh the perceived risks.

Given the semantics of the web, it is not always possible for someone using a web browser to determine when a portion of a web page is referencing content from a different domain than which served the web page. This introduces an unwelcome element of risk anytime a user ventures out on the World Wide Web. As a result, new approaches for addressing the security risks posed by content embedded within a web page are desirable.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
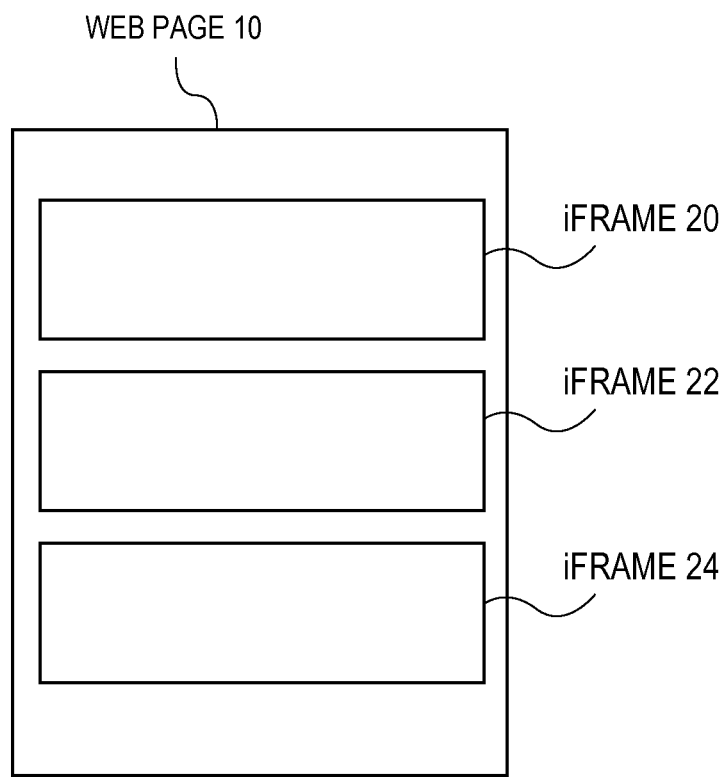
FIG. 1 is a block diagram of a web page according to the prior art.

Approaches for securing an endpoint by proxying document object models and windows are presented herein. The secure proxy of an embodiment may be used to secure a document, such as a web page, against any undesirable actions or consequences requested by or resulting from content either embedded within the document or contained within a window launched by the document. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

System Overview

Embodiments of the invention employ a proxy to represent a document, such as a web page. The proxy can secure the document (termed the "parent document" or "parent web page" herein) against any undesirable actions or consequences requested by or resulting from content (termed the "child content" or "child web page" herein) embedded within the document or contained within a window launched by code contained within the document. An action requested by child content that affects the parent document is initially performed on the proxy rather than the parent document itself. If the consequence of performing the action against the proxy is deemed acceptable to or in compliance with a set of stored policies, then the action is subsequently performed against the parent document. Similarly, if the consequence of performing the action against the proxy is not deemed acceptable to or in compliance with a set of stored policies, then the action is not performed against the parent document. In this way, any child content embedded within, or contained within a window launched by, a parent document cannot perform an action against or otherwise affect the parent document if the action would conflict with a policy. The set of policies may consider a wide variety of different factors and be arbitrarily complex so as to accommodate a diverse array of security concerns across numerous different contexts.

Any type of document may be secured using an embodiment. It is anticipated that embodiments will be particular useful in securing web pages; therefore, for ease of explanation the type of document being secured will be chiefly referred to herein as a parent web page and numerous concrete examples will be presented herein which involve web pages. However, embodiments of the invention are not limited to any particular context or type of document. Embodiments may be used to secure any type of document which comprises an abstract container (such as an iFrame, a window, and the like) that permits content, obtained from an outside source, to be displayed or included therein.

Note that the abstract container need not be embedded within the parent document in all embodiments; embodiments may also be used to secure any type of document which allows another abstract container, such as a window or pop up dialogue box, to be launched from the parent document and which permits content, obtained from an outside source, to be displayed therein. For example, a parent document may comprise a script that, when executed, launches a separate window that displays a different web page. In this content, the web page being displayed in the separate window may be treated by embodiments as a child web page.

A web page may be composed of subroutine (such as JavaScript functions) and shared data structures. Thus, a parent web page that embeds another web page (a "child web page") within an abstract container (such as an iFrame) will contain the subroutines of the child web page. Since there is no requirement that a child web page originate from the same domain as the parent web page, it is possible for a child web page to contain code that, either intentionally or not, performs undesirable or malicious actions upon the parent web page.

To illustrate a concrete example, assume that a parent web page comprises a child web page within an iFrame. The child web page may be an advertisement that is served from an ad network. If the child web page contains malicious code, such code may be used to compromise or deceive the user, e.g., the code may update the content on the parent web page or cause the web browser displaying the parent web page to navigate to a different web page. Fortunately, embodiments of the invention would prevent the child web page from affecting the parent web page if the actions performed by the child web page would violate one or more policies.

Figure 2A:
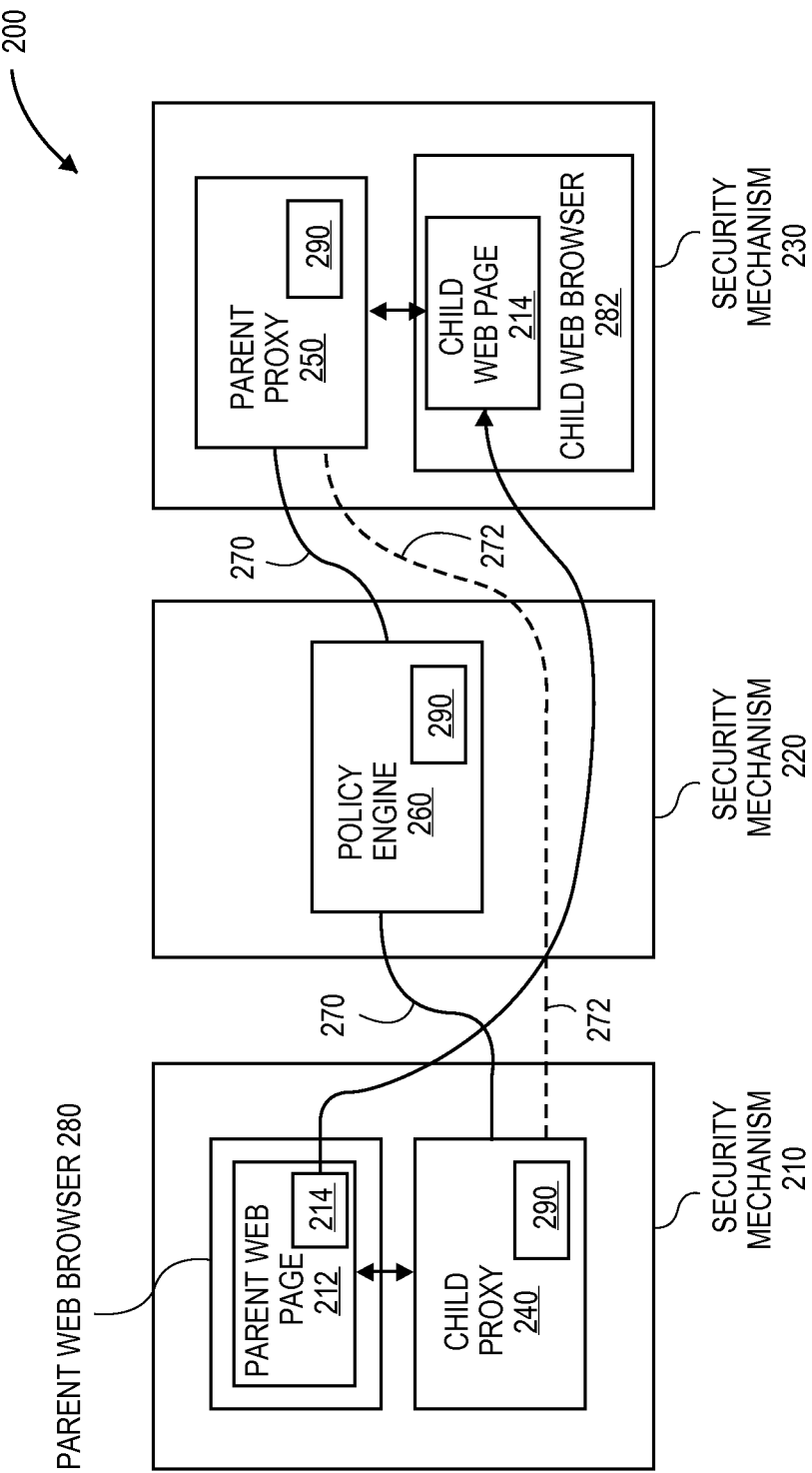
FIGS. 2A and 2B are block diagrams of a system according to embodiments of the invention.

When a child web page is launched in a new window by executing a script within a parent web page, the child web page may also be configured to perform a set of operations on the parent web page, such as an open operation, a close operation, and a navigate operation, to name a few examples. Using embodiments of the invention, a child web page launched in a new window from a parent web page is prevented from performing any action against the parent web page that would violate one or more policies. FIG. 2A is a block diagram of a system 200 according to an embodiment of the invention. In an embodiment, system 200 comprises security mechanisms 210, 220, and 230. Security mechanisms 210, 220, and 230 may be, but need not be, implemented on the same physical device. Security mechanisms are each meant to represent any hardware or software mechanism for separating portions of memory and other system resources such that a process executing within or associated with a security mechanism has access only to the memory and system resources of that security mechanism. Security mechanisms 210, 220, and 230 may be implemented by a variety of different mechanisms. In one embodiment, one or more of security mechanisms 210, 220, and 230 may be implemented by a virtual machine. In another embodiment, one or more of security mechanisms 210, 220, and 230 may be implemented as different processes. In another embodiment, one or more of security mechanisms 210, 220, and 230 may be implemented by a software sandbox or may correspond to a separate machine.

To secure a web browser according to an embodiment, the web browser may be executed within a security mechanism. As shown in FIG. 2, security mechanism 210 executes web browser 280. Web browser 280 is responsible for rendering parent web page 212. Parent web page 212 contains one or more documents that are embedded within in an abstract container (such as an iFrame) comprised within parent web page 212. One embedded document with parent web page 212, namely child web page 214, will be referred to herein with reference to examples on how embodiments operate. However, while FIG. 2A only depicts child web page 214, note that parent web page 212 may contain any number of embedded documents.

As web browser 280 executes within security mechanism 210, web browser 280 can only access the memory address space and system resources available to security mechanism 210. Indeed, no processes executing within one security mechanism can access the memory space or the system resources associated with or assigned to another security mechanism.

Web browser 280 is responsible for rendering parent web page 212. Parent web page 212 contains child web page 214 (also referred to herein as embedded content 214) embedded within an iFrame. When child web page 214 is selected or clicked by a user, a process is invoked to perform an action, such as retrieve a referenced web page or execute a particular script. In embodiments, this process may, in general, executed within a different security mechanism than security mechanism 210. For example, as shown in FIG. 2, an arrow is shown from child web page 214 in security mechanism 210 to child web page 214 executing within security mechanism 230. Thus, in the example of FIG. 2, when child web page 214 is selected by a user to request the performance of an operation, the requested operation is performed in security mechanism 230 rather than security mechanism 210. Since child web browser 282 can only access the memory space associated with or assigned to security mechanism 230; as a consequence, child web browser 282 cannot directly access the memory associated with or assigned to security mechanism 210 or 220.

Also executing within security mechanism 210 is child proxy 240. Child proxy 240 and parent proxy 250 cooperate to act as a middle layer or interface between parent web page 212 and child web page 214. The operation of child proxy 240 and parent proxy 250 will be explained below with reference to FIG. 3.

Parent proxy 250 executes within security mechanism 210, which is a different security mechanism that that in which both parent web page 212 and child proxy 240 execute. Neither parent proxy 250 nor child web browser 282 can access the memory or any system resources associated with parent web page 212 or child proxy 240.

Parent proxy 250 comprises a document object model (DOM) that has the same one or more abstract containers (such as HTML iFrames) as parent web page 212. Therefore, if parent web page 212 has three iFrames named A. B, and C, then parent proxy 250 would also have three iFrames named A, B, C. Not only does parent proxy 250 possesses the same number of abstract containers as parent web page 212, but they also have the same names as parent web page 212. This is so because when child web browser 282 performs a request originating from an embedded document of parent web page 212, the request is designed to be performed against a web page having the same structure as parent web page 212. Therefore, to evaluate whether the request is a legitimate request and to assess the impact of performance the request, parent proxy 250 mimics the same structure as parent web page 212. The use of parent proxy 250 in this regard will be elaborated upon in greater detail below with reference to FIG. 3.

Policy engine 260 refers to a functional component for centrally storing policy data 290. In an embodiment, policy engine 260 may communicate with a plurality of child proxies 240 and/or parent proxies 250. FIG. 2A illustrates policy engine 260 being executed within or by a different security mechanism than either parent web page 212 or child web page 214. This is so for security reasons, as doing so prevents any code contained within parent web page 212 or child web page 214 from accessing policy engine 260. In other embodiments, policy engine 260 may be executed within security mechanism 210 and/or 230. Policy engine 260 is optional and in certain embodiments may not be included.

Figure 2B:
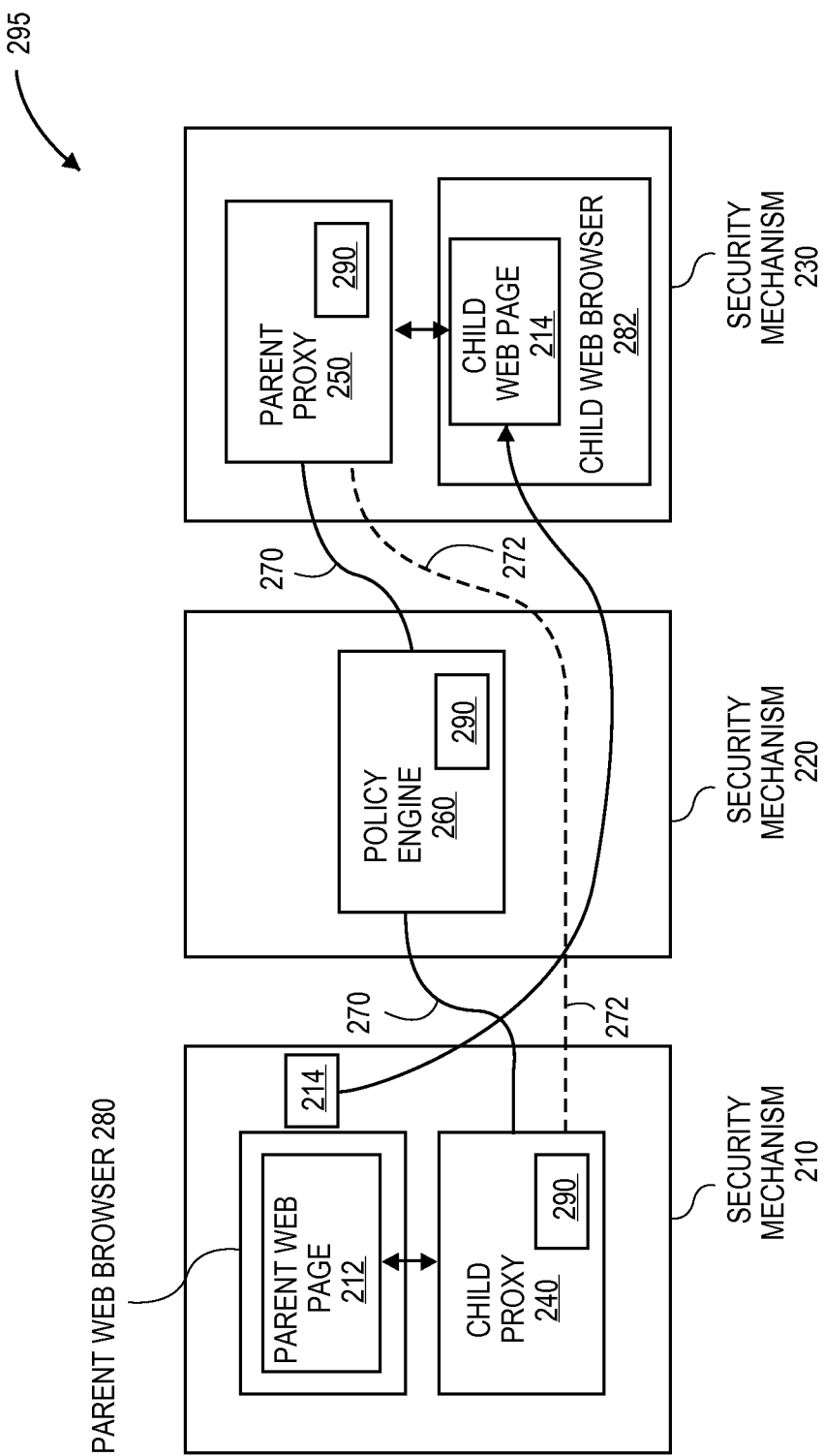

FIG. 2B is a block diagram of a system 295 according to an embodiment of the invention. System 295 of FIG. 2B operates similar to that of system 200 described above except that child web page 214 is not embedded within parent web page 212. Instead, in system 295, child web page 214 is contained in a window that is launched by code contained within parent web page 212.

Prior to explaining the operation of a secure proxy according to an embodiment of the invention, a description of policy data 290 stored in one or more of child proxy 290, parent proxy 250, and policy engine 260 will be presented.

Policy Data

Policy data 290 is data that describes one or more policies that are used by embodiments to determine whether an action performed, requested, or otherwise caused by child content should be reflected or performed upon the parent document. Policy data 290 may be used to implement policies that allow or deny certain actions originating from child content based upon choices made in the tradeoff between security and functionality. As embodiments may be implemented to reflect different choices between the importance of security and allowing functionality and promoting interoperability, policy data 290 will likely differ across implementations.

Different embodiments may store policy data in different locations within system 200. Policy data 290 may be stored in one or more of child proxy 240, parent proxy 250, and policy engine 260. Embodiments which do not store use policy data 290 stored at policy engine 260 need not include policy engine 260 within system 200. If policy data 290 is stored at policy engine 260, then child proxy 240 and/or parent proxy 250 may communicate with policy engine 260 to either receive updated policy data 290 or to involve policy engine 260 in a determination of whether an action violates policy data 290.

Furthermore, different polices may be stored at different locations, and thus, the particular policies stored at one location may be different than the particular policies stored at a different location. Thus, if a policy is to be implemented or enforced by parent proxy 250, then it may not be necessary for such a policy to be stored at child proxy 240.

In an embodiment, the policy data describes desired security behavior of a web page with respect to its child web pages. Such policy data may be embedded within or downloaded by the parent web page. This policy data may be defined by a user, such as a system administrator, using a system management mechanism. One example of a system management mechanism is a Group Policy Objects in Active Directory.

There are no limitations on the policies which may be comprised within policy data 290. Policy data 290 may be arbitrarily complex and may consider a wide array of factors. To illustrate certain concrete examples of policies which may be included in policy data, in an embodiment, policy data 290 may prevent a request originating from embedded content within parent web page 212 from navigating parent web browser 280 from parent web page 212 to a different web page.

As another example, in an embodiment, policy data 290 may define a policy that prevents a request originating from embedded content within parent web page 212 from writing or changing any portion of parent web page 212 outside of the abstract container (such as an iFrame) in which the request originated. Such a policy advantageously prevents any embedded content, such as an advertisement or social media links (such as a Facebook "like" button or other such social media share functionality) from updating parent web page 212 without the consent of either the administrator of parent web page 212 or the user administrator of the computer system. This way, malicious attacks originating in an embedded document within parent web page 212 cannot change the appearance of parent web page 212 outside of bounds of the embedded document or otherwise violate the integrity of parent web page 212.

As another example, in an embodiment, policy data 290 may define a policy that considers the security risk posed by parent web page 212, or the web site in which it belongs, when determining whether the request is permissible. For example, certain high risk sites, such as a bank web site or a government web site, may deny more requests than a lower risk site.

As another example, in an embodiment, policy data 290 may define a policy that considers whether a request from embedded content within parent web page 212 is referencing code or data from the same domain as parent web page 212 when determining whether the request is permissible. For example, if a child document references code or data within the same domain as parent web page 212, then the request may be permitted under the assumption that the domain should be trusted since it is presumably under control of the administrator of parent web page 212. Conversely, if a child document references code or data outside of the domain of parent web page 212, then the request may be denied under the assumption that the domain could contain malicious code since the domain is outside the control of the administrator of parent web page 212.

As another example, in an embodiment, policy data 290 may define a policy that considers which HTML iFrames are present within parent web site 212 when determining whether the request is permissible. For example, an iFrame may have a name or a label which may be referenced by a policy to allow any request originating in a child document embedded within that iFrame to be permitted or denied.

Using a Secure DOM Proxy

Figure 3:
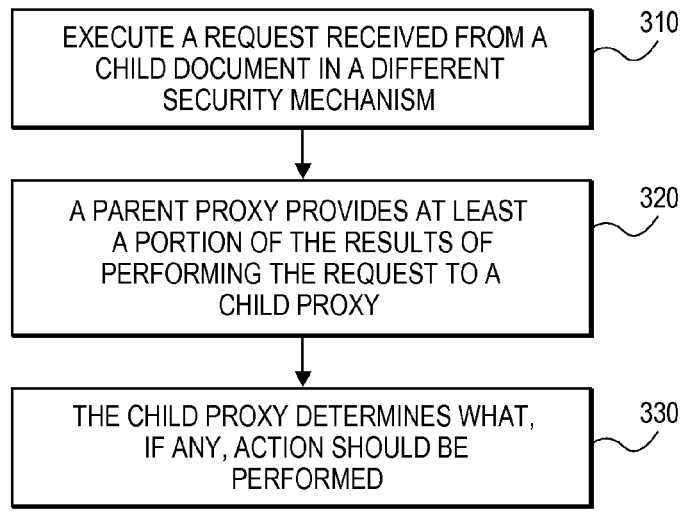
FIG. 3 is a flowchart illustrating the steps of using a secure DOM proxy according to an embodiment of the invention.

FIG. 3 is a flowchart illustrating the steps of using a secure DOM proxy according to an embodiment of the invention. In step 310, parent web browser 280 receives a request from child document 214. Child document 214 may be comprised within an HTML iFrame within parent web page 212 as shown in FIG. 2A, although any mechanism for embedded separate documents within parent web page 212 may be used to insert child document 214 within parent web page 212. Alternately, child document 214 may be displayed in a window launched from code contained in parent web page 212, as in shown in FIG. 2B.

The request of step 310 may be initiated by a user performing an action relative to child document 214. For example, the request may be initiated by the user clicking on a link, button, or graphic displayed on child document 214. Alternately, child document 214 may contain code, which when executed by parent web browser 280, initiates the request. For example, child document 214 may contain JavaScript that initiates the request whenever a user performs a mouse over operation upon child document 214.

The request initiated by child document 214 is redirected to security mechanism 230 where it is performed by child web browser 282 rather than parent web browser 280. Thus, the request of step 310 is executed in a separate memory & system resource space than in which parent web page 212 resides. In an embodiment, child web browser 282 and/or security mechanism 230 may be instantiated in response to receiving the request of step 310.

In different embodiments, different entities may be responsible for redirecting the request originating at child document 214 to security mechanism 230. For example, in one embodiment, parent web browser 280, or a plug-in associated therewith, may be responsible for redirecting a request originating at child document 214 to child web browser 282 in security mechanism 230. In another embodiment, a software module (not depicted in FIG. 2) executing within security mechanism 210 may be responsible for redirecting a request originating at child document 214 to child web browser 282 in security mechanism 230.

The operation requested by child document 214 is then attempted to be performed against parent proxy 250. Note that this request is performed against parent proxy 250 rather than against parent web page 212. Since parent proxy 250 comprises the same structure of document object model (DOM) as parent web page 212, any requested operation that would have been successfully performed against parent web page 212 will be successfully performed against parent proxy 250. For example, assume parent web page 212 and parent proxy 250 both contain an iFrame named "Frame_ABC." If the operation requested by child document 214 is directed against an iFrame named "Frame_ABC," then the operation will be successfully performed against this iFrame within parent proxy 250. Similarly, if the operation requested by child document 214 is to navigate parent web page 212 to a different web page, then this operation will cause the parent page simulated by parent proxy 250 to navigate to a different web page.

On the other hand, if the operation requested by child document 214 references an iFrame that is not present within parent web page 212, then the operation will not be successfully performed against parent proxy 250.

In step 320, parent proxy 250 may consult proxy data 290 to determine whether the result of performing the operation requested by child document 214 against parent proxy 250 violated any policies defined by proxy data 290. In doing so, parent proxy 250 may consult proxy data 290 stored locally at parent proxy 250 or remotely at policy engine 260 via communications channel 270. Based on this consultation with proxy data 290, parent proxy 250 may provide at least a portion of the results of performing the request to child proxy 240 over communications channel 272.

However, if policy data 290 indicates that the actions caused by the performance of the operation requested by child document 214 against parent proxy 250 violated a policies defined by proxy data 290, the parent proxy 290 will conclude that the operation presents a security risk and parent proxy will not forward any results of performing the operation to child proxy 240 over communication channel 272.

In step 330, upon receiving a communication from parent proxy 250 that indicates the results of performing the operation against parent proxy 250, child proxy 240 may also consult policy data to determine whether the operation violated any policies defined by policy data 290. Child proxy 240 may consult proxy data 290 stored locally at child proxy 240 or remotely at policy engine 260 via communications channel 270. After consulting policy data 290, child proxy 240 determines what, if any, content within the results of performing the operation requested by child document 214 should be sent to parent web browser 280.

For example, policy data 290 may define a policy that prevents child document 214 from causing parent web page 212 to navigate to another web page. Thus, child proxy 240 (or parent proxy 250 in an embodiment) may prevent such an operation requested by child document 214 from being performing against parent web page 212

Note that embodiments of the invention may handle more than one parent-child relationship. A parent web page may have a plurality of child web pages (such as shown in FIG. 1). Embodiments of the invention may process each child web page separately with a different parent proxy 250 for that child web page. In other words, if a parent web page contains multiple child web pages, then each child web page may be processed separately using the process discussed above with respect to FIG. 3.

In an embodiment, instances of child proxy 240 and/or parent proxy 250 may be created dynamically (i.e., "on-the-fly") as needed rather than being initiated up front prior to when they are used. This is so because during normal use and display of parent web page 212, a user may, at his or her own initiative, initiate the display of any number of child web pages 214. Therefore, embodiments of the invention may respond dynamically to service the particular child web pages present at that time by dynamically initiating any number of child proxies 240 and parent proxies 250. When an instance of child proxy 240 or parent proxy 250 is no longer required, it may be de-allocated or destroyed by embodiments to conserve memory. In an embodiment, based on policies defined in the policy data, each navigation event can be dynamically allowed to either continue using the same set of parent and child proxies, a different but existing set of parent and child proxies, or a set of parent and child proxies to be instantiated in a new security mechanism, such as a virtual machine or a process.

Hardware Mechanisms

Figure 4:
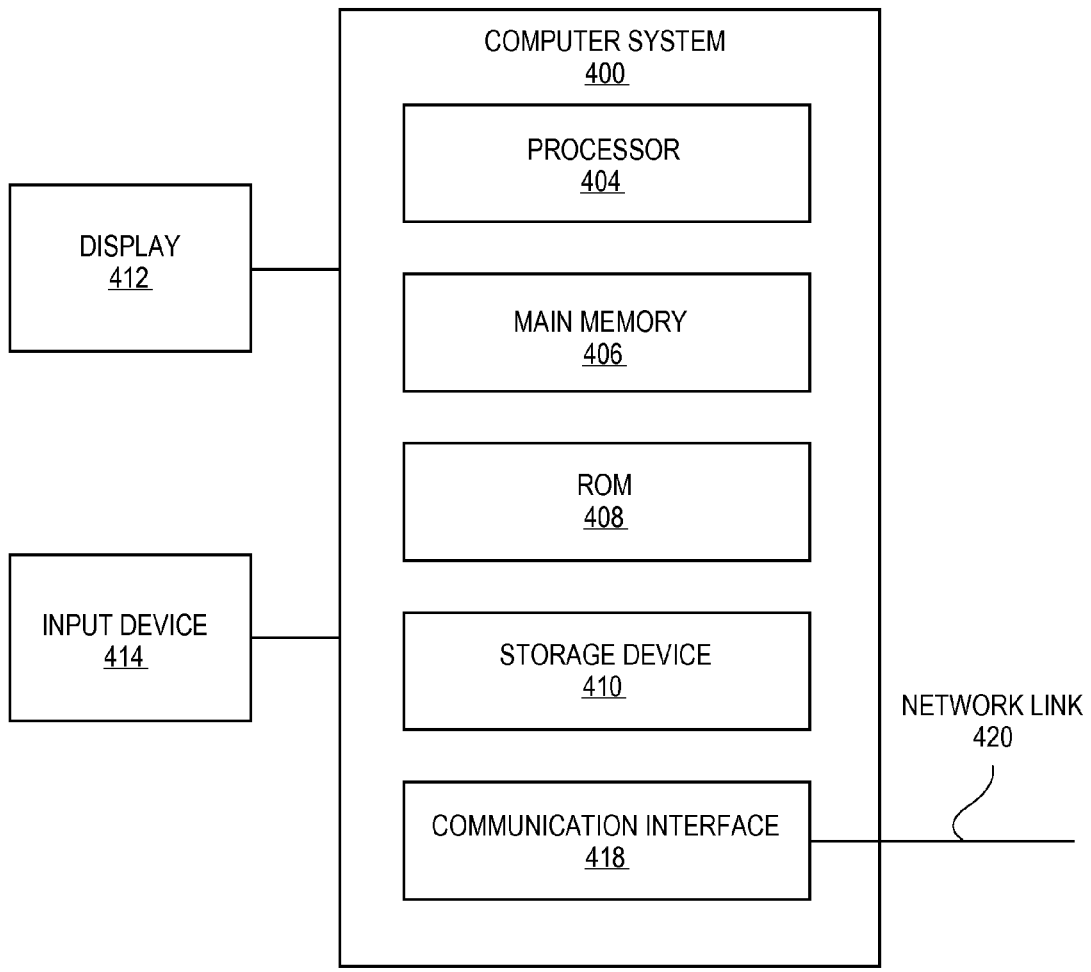
FIG. 4 is a block diagram that illustrates a computer system upon which an embodiment of the invention may be implemented.

In an embodiment, the steps of FIG. 3 may be implemented on or performed by software executing on a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for processing an action initiated at a parent web page displayed by a web browser, which when executed by one or more processors, cause:
   upon receiving a request from a particular child document that is either embedded within the parent web page or contained within a window that is launched from the parent web page, executing the request in a second memory address space separated from a first memory address space in which the parent web page is maintained,
   wherein the request is performed within the second memory address space using a parent proxy to represent the parent web page;
   the parent proxy providing at least a portion of the results of executing the request to a child proxy; and
   the child proxy consulting policy data to determine what, if any, content within the results should be sent to the web browser.

2. The one or more non-transitory computer-readable storage mediums of claim 1, wherein the web browser executes within a first virtual machine which can access the first memory address space, and wherein the request is performed within a second virtual machine, different than the first virtual machine, which can access the second memory address space.

3. The one or more non-transitory computer-readable storage mediums of claim 1, wherein the web browser is executed by a first process which can access the first memory address space, and wherein the request is performed by a second process which can access the second memory address space but not the first memory address space.

4. The one or more non-transitory computer-readable storage mediums of claim 1, wherein the web browser can access the first memory address space but not the second memory address space, wherein both the request and the parent proxy execute within the second memory address space, and wherein both the request and the parent proxy cannot access the first memory address space.

5. The one or more non-transitory computer-readable storage mediums of claim 1, wherein the first memory address space is available to a first security mechanism for separating running programs, and wherein the second memory address space is available to a second security mechanism for separating running programs different than the first security mechanism.

6. The one or more non-transitory computer-readable storage mediums of claim 1, wherein the parent proxy comprises the same one or more HTML iFrames as the parent web page.

7. The one or more non-transitory computer-readable storage mediums of claim 1, wherein the policy data prevents the request from navigating the web browser from parent web page to a different web page.

8. The one or more non-transitory computer-readable storage mediums of claim 1, wherein the policy data prevents the request from writing or changing any portion of the parent web page outside of the HTML iFrame in which the request originated.

9. The one or more non-transitory computer-readable storage mediums of claim 1, wherein the policy data considers a security risk posed by the parent web site when determining whether the request is permissible.

10. The one or more non-transitory computer-readable storage mediums of claim 1, wherein the policy data considers whether the request references code or data from the same domain as the parent web site when determining whether the request is permissible.

11. The one or more non-transitory computer-readable storage mediums of claim 1, wherein the policy data considers which HTML iFrames are present within the parent web site when determining whether the request is permissible.

12. The one or more non-transitory computer-readable storage mediums of claim 1, wherein the policy data consulted by the child proxy is not stored at the child proxy.

13. The one or more non-transitory computer-readable storage mediums of claim 1, wherein the policy data is stored at a policy engine, and wherein the policy engine communicates with a plurality of child proxies.

14. The one or more non-transitory computer-readable storage mediums of claim 1, wherein the request is not performed against the parent web page if, in consulting the policy data, a determination is made that the request presents a security risk.

15. The one or more non-transitory computer-readable storage mediums of claim 1, wherein the child proxy executes in the first memory address space.

16. The one or more non-transitory computer-readable storage mediums of claim 1, wherein execution of the one or more sequences of instructions further cause:
    after determining that the particular child document does not pose a security risk, processing a subsequent request originating from the particular child document within the first memory address space.

17. The one or more non-transitory computer-readable storage mediums of claim 1, wherein the request is an instruction to navigate from the parent web page to a new web page, and wherein execution of the one or more sequences of instructions further cause:
    performing the request within the second memory space by causing the parent proxy to navigate to the new web page, wherein the web browser does not navigate away from the parent web page as a result of the request.

18. The one or more non-transitory computer-readable storage mediums of claim 1, wherein execution of the one or more sequences of instructions further cause:
    processing at least the first request originating from each of the one or more child documents in a separate virtual machine.

19. The one or more non-transitory computer-readable storage mediums of claim 1, wherein execution of the one or more sequences of instructions further causes:
    in response to receiving the request, creating an instance of the parent proxy in the second memory address space to service said request.

20. The one or more non-transitory computer-readable storage mediums of claim 1, wherein execution of the one or more sequences of instructions further causes:
    upon receiving a second request from a different child document of said parent web page, consulting policy data to determine whether the second request should be processed within said second memory address space or a third memory address space that is different than said first memory address space and said second memory address space.

21. The one or more non-transitory computer-readable storage mediums of claim 1, wherein the parent web page comprises a plurality of different child documents, and wherein requests originating from each of the plurality of different child documents are processed by a different parent proxy.

22. The one or more non-transitory computer-readable storage mediums of claim 1, wherein the policy data describes desired security behavior of a web page with respect to child web pages, and wherein the policy data is embedded within or downloaded by the parent web page.

23. The one or more non-transitory computer-readable storage mediums of claim 22, wherein the policy data is defined by a user using a system management mechanism.

24. One or more non-transitory computer-readable storage mediums storing one or more sequences of instructions for processing an action initiated at a parent web page displayed by a web browser, which when executed by one or more processors, cause:
    upon receiving a request from a child document that is either embedded within the parent web page or comprised within a window launched by the parent web page, performing the request in a different virtual machine than the virtual machine in which the web browser is executing,
    wherein the request is performed using a parent proxy to represent the parent web page, wherein the parent proxy comprises the same set of HTML iFrames as the parent web page;
    the parent proxy providing at least a portion of the results of executing the request to a child proxy; and
    the child proxy consulting policy data to determine what, if any, content within the results should be sent to the web browser.

25. The one or more non-transitory computer-readable storage mediums of claim 24, wherein the child proxy executes within said virtual machine.

26. An apparatus for processing an action initiated at a parent web page displayed by a web browser, comprising:
    one or more processors; and
    one or more non-transitory storage mediums storing one or more sequences of instructions, which when executed by the one or more processors, cause:
        upon receiving a request from a particular child document that is either embedded within the parent web page or contained within a window that is launched from the parent web page, executing the request in a second memory address space separated from a first memory address space in which the parent web page is maintained, wherein the request is performed using a parent proxy to represent the parent web page, wherein the parent proxy comprises the same set of HTML iFrames as the parent web page;

the parent proxy providing at least a portion of the results of executing the request to a child proxy; and the child proxy consulting policy data to determine what, if any, content within the results should be sent to the web browser.

* * * * *